United States Patent [19]

Terbrack et al.

[11] Patent Number: 4,649,570

[45] Date of Patent: Mar. 10, 1987

[54] HEADSET RECEIVER CARTRIDGE AND EARPHONE CASE THEREFOR

[75] Inventors: William H. Terbrack, Irvine; Harvey F. Brion, Mission Viejo; Ronald J. Minear, Huntington Beach, all of Calif.

[73] Assignee: Hughes Aircraft Company, Los Angeles, Calif.

[21] Appl. No.: 868,880

[22] Filed: May 23, 1986

Related U.S. Application Data

[63] Continuation of Ser. No. 717,587, Mar. 29, 1985, abandoned, which is a continuation of Ser. No. 607,715, May 7, 1984, abandoned, which is a continuation of Ser. No. 354,120, Mar. 2, 1982, abandoned.

[51] Int. Cl.[4] .......... H04B 1/08

[52] U.S. Cl. .......... 455/344; 455/347; 455/351; 379/452; 381/187; 381/205

[58] Field of Search .......... 455/89, 90, 344–347, 455/351; 179/156 R, 182 R, 182 A, 185; 181/131

[56] References Cited

U.S. PATENT DOCUMENTS

| | | | |
|---|---|---|---|
| 2,470,687 | 5/1949 | Cafrella et al. | 455/351 |
| 2,472,899 | 6/1949 | Du Mont . | |
| 2,512,641 | 6/1950 | Halstead | 455/344 |
| 2,856,022 | 10/1958 | Kurtze et al. . | |
| 3,169,171 | 2/1965 | Wachs et al. | 179/185 |
| 3,330,955 | 7/1967 | Barecki et al. . | |
| 3,476,455 | 11/1969 | Barecki et al. . | |
| 3,789,164 | 1/1974 | Ryder | 179/156 R |
| 3,830,334 | 8/1974 | Costa | 179/182 A |
| 3,851,123 | 11/1974 | Lipinski et al. | 455/351 |
| 3,927,316 | 12/1975 | Citta . | |
| 4,031,468 | 6/1977 | Ziebell et al. | 455/346 |
| 4,044,247 | 8/1977 | Brown, Jr. . | |
| 4,057,757 | 11/1977 | Darden, Jr. | 455/89 |
| 4,091,734 | 5/1978 | Redmond et al. . | |
| 4,099,050 | 7/1978 | Sauermann . | |
| 4,151,407 | 4/1979 | McBride et al. . | |
| 4,203,667 | 5/1980 | Pierce et al. . | |
| 4,211,995 | 7/1980 | Smith | 455/345 |
| 4,229,829 | 10/1980 | Grunwald . | |
| 4,352,200 | 9/1982 | Oxman | 455/345 |
| 4,410,890 | 10/1973 | Davis et al. | 455/351 |

OTHER PUBLICATIONS

"Handheld Transceivers PU 04, PU 07 and PU 16" by Sonab, 6/1975.

"FM 545 Two-Way Portable Radio" by Johnson, 1/1974.

"Stereo Drahtlos", Infrarot-Stereo-Kopfhorer, in a Swiss publication, Radio-TV-Electronics, vol. 37, No. 5, 5/77, pp. 67–69.

"Fernsenton über Infrarot-licht zum Kopfhörer Oder zur HiFi-Anlage", Austrian publ. Radio Electronik Schau, vol. 51, No. 9, 1975, pp. 484–486.

Sennheiser Review, 8/1979, front cover, pp. 2, 3, 72, 74, 76, 77, 80 and back cover.

*Primary Examiner*—Jin F. Ng

*Attorney, Agent, or Firm*—Lewis B. Sternfels; A. W. Karambelas

[57] ABSTRACT

A headset receiver comprises a cartridge (10) containing all electronic receiving functional parts, and a passive case (32) which serves a protective envelope for the cartridge while conducting sound from the cartridge through acoustical stems (52) to a listener's ears. The case, which contains no active components and is a low cost disposable item, is designed to serve as a sanitation envelope for the cartridge. It is to be separated from the cartridge at the end of an airplane flight, removed from the aircraft, and disposed of or, alternatively, sanitized and repackaged with a new battery and fresh earpads, and returned to another passenger. To secure the cartridge from theft or misplacement, a lanyard (26) tethers the cartridge to a passenger's seat (28).

22 Claims, 3 Drawing Figures

HEADSET RECEIVER CARTRIDGE AND EARPHONE CASE THEREFOR

This is a continuing application of copending application Ser. No. 717,587 filed Mar. 29, 1985, which is a continuing application of Ser. No. 607,715 filed May 7, 1984, which is a continuing application of Ser. No. 354,120 Mar. 2, 1982, all abandoned.

BACKGROUND OF THE INVENTION

1. Field of the Invention

The present invention relates to headset receivers and, in particular, to the combination of a separate receiver and an earphone case therefor.

2. Description of the Prior Art

While the present invention is particularly adapted for use in aircraft passenger entertainment systems, it is to be understood that its use is as applicable for listeners in any environment. However, because the invention was devised specifically for aircraft passenger entertainment systems, the ensuing discussion and description will be specific thereto.

The existing passenger entertainment system on aircraft utilizes acoustical headsets, which are plugged into a mating recepticle in individual seat arms. The acoustical signal is derived from various electronic components including a control unit in the passenger's seat arm, an electronics box at the seat, and other electronic hardware elsewhere on the airplane.

It is generally agreed among users of the existing acoustical headsets that they are cumbersome because the headset must be connected to the seat arm, that they have relatively poor sound reproduction because of the extreme length of the acoustical tubing, and that they have an inherently uncomfortable fit. However, they are relatively inexpensive so that, after they are retrieved after each flight, they may be discarded or, if desired, cleaned and returned to the next user. The low cost of the existing acoustical headsets, however, is more than compensated for by the high cost of that electronic equipment which is in the seat and the cost of the installation therein and repair thereof. In addition, existing hardware adds between 250 and 350 pounds to airborne vehicles.

Companion patent application Ser. No. 354,101, now U.S. Pat. No. 4,465,907 entitled "Headset Receiver and Storage and Sanitizing Case Therefor" by the same inventors hereof and filed concurrently herewith, overcomes and avoids the problems described above. The invention described therein involves the use of a special storage case with means for sanitizing each headset receiver. For some users, such as aircraft companies or other suppliers of entertainment, such a storage and sanitation case may not be preferred as being undesired extra equipment involving an additional, albeit small, added cost. Therefore, an alternative was suggested in the form of the present invention.

SUMMARY OF THE INVENTION

The present invention utilizes a cartridge whose housing contains a receiver of wireless transmitted information. The cartridge is receivable within a disposable case which serves not only as a protective and sanitized envelope for the cartridge but also as a means for conducting sound from the cartridge to a listener's ears. Since the case contains no active components, its cost is low and, therefore, it is disposable and can be furnished as a sanitized item within a suitably sealed envelope. It is designed to be separated from the cartridge at the end of its use, such as at the end of an airplane flight, removed from the premises or aircraft, and disposed of. Alternatively, if desired, it may be sanitized and repackaged with a new battery and fresh earpads and returned for another flight. It may, in addition, utilize the storage and sanitizing case of companion application Ser. No. 354,101, now U.S. Pat. No. 4,465,907. The more expensive cartridge with its electronic components may be either collected by an attendant or tethered to the seat by a lanyard and retained within a pouch at the seat.

Several advantages are derived from the present invention. It permits a relatively high cost cartridge to be left aboard the aircraft or other entertainment center and to be collected either by an attendant or left at the listener's seat. Pilferage or misplacement of the cartridge is minimized, especially when it is tethered to the seat. Sanitization is simplified. Being small and light weight, both the cartridge and the case eliminate considerable weight, which is particularly important in aircraft. For example in a widebodied type airplane, it is estimated that approximately 150 to 250 pounds can be saved with attendant savings in fuel consumption and cost. The acoustical stems leading from the case to the listener's ears can be short, thereby increasing the fidelity of the sound transmitted.

Several advantages follow from the above system. If used with the carrying and storage case of companion application Ser. No. 354,101, now U.S. Pat. No. 4,465,907, it provides an accurate method of headset accountability as well as automatic sanitizing of the headsets as a normal occurrence during their insertion or withdrawal from storage case. In both cases, it enables the headsets to be used on a particular aircraft and kept on board, thereby eliminating the need for continual reprovisioning.

The cartridge itself provides several advantages. It comprises a wireless design and, therefore, eliminates any electrical or acoustical connections to the arm of the seat. The shortness of the stems not only improves the quality of sound to the passenger's ears but is also more easily shapable to ensure a comfortable fit. The smooth exterior not only eliminates snagging and enhances storage within the case, but is also esthetically pleasing. It enables a battery to be easily replaced. It also provides easy access to the system controls, that is, it avoids a prior problem of blockage of the seat arm controls by seat trays, blankets and the like. As a corollary, should the unit malfunction, it can be easily replaced and, if desired, repaired away from the seat and the aircraft, thereby decreasing the non-used time of the aircraft over the time needed to repair conventional in-seat arm electronics.

Other aims and advantages as well as a more complete understanding of the present invention will appear from the following explanation of an exemplary embodiment and the accompanying drawings thereof.

DETAILED DESCRIPTION OF THE INVENTION

Figures 1, 2, 3:
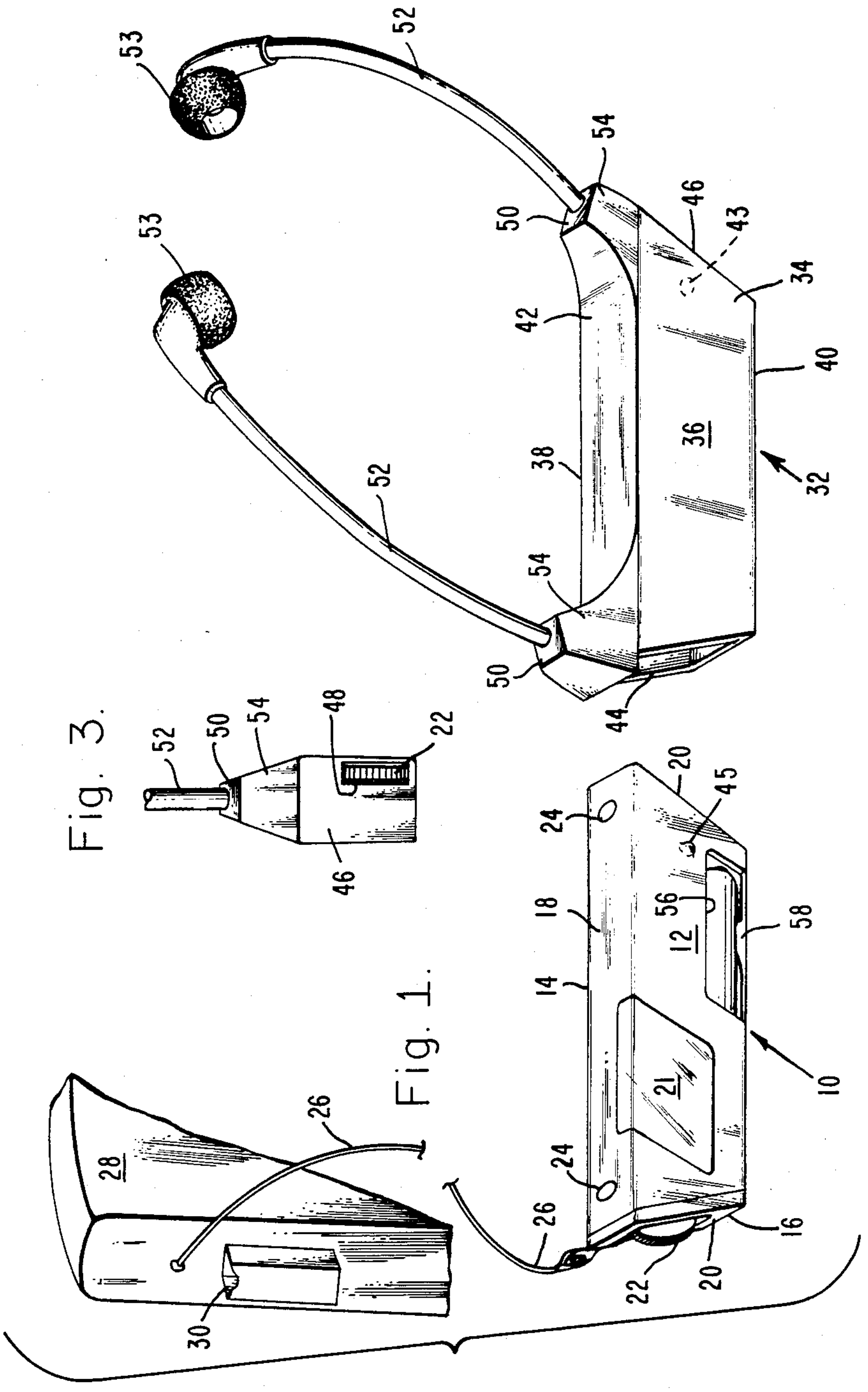
FIG. 1 depicts a cartridge for housing a receiver of wireless-transmitted information, and a lanyard tethering the cartridge to a seat.
FIG. 2 is a perspective view of a case for receiving the cartridge and for furnishing sound from the cartridge to a listener's ears.
FIG. 3 is a view of the case taken from its closed end, as viewed from the right side of FIG. 2, with a cartridge received therein.

As illustrated in FIG. 1, a cartridge or housing 10 contains all the electronic circuits needed to receive electromagnetic energy, such as infrared (IR) energy, from a transmitter.

Electronic circuits for generating and receiving IR signals are known in the art. Examples include U.S. Pat. No. 4,229,829 and the references cited therein, and two publications entitled "Stereo drahtlos" (Wireless Stereo), "Infrarot-Stereo-Kopfhörer" (Infrared Stereo Headphones), appearing in a Swiss publication entitled "radio-tv-electronic", Vol. 37, No. 5, May 1977, pages 67–69, and "Fernsehton über Infrarot-licht zum Kopfhörer oder zur HiFi-Anlage" (Infrared Transmission of Television Sound Channels to Headphones or Hi-Fi Equipment), appearing in an Austrian publication entitled "Radio Elektronik Schau", Vol. 51, No. 9, 1975, pp. 484–486. A similar headphone to that illustrated in the second figure of the latter publication appears in the tenth edition of the Sennheiser Review of August 1979 on pp. 76 and 77 thereof.

Housing 10 is shown as having a smooth exterior surface including front surface 12, rear surface 14, and edge surfaces including bottom surface 16, top surface 18, and side surfaces 20. Shown as extending on front and top surfaces 12 and 18 is a cover 21 which is flush with surfaces 12 and 18 and acts to protect the detector of electromagnetic energy. Channel selection and volume controls are effected by turnable, knurled knobs 22 which are placed at ends or sides 20 of the cartridge. Sound is transmitted from ports 24 positioned on top surface 18, or other appropriate surface.

To prevent pilferage or misplacement of the cartridge, a lanyard 26 may be tethered at its ends to the case and to a seat 28. A pouch 30 may be secured to the seat to receive the cartridge when not in use.

When in use, cartridge 10 is slipped within a case 32 shown in FIGS. 2 and 3. Case 32 comprises a tubular shell 34 whose interior configuration is substantially the same as the exterior configuration of cartridge 10 to permit receipt thereof. The case includes front and rear faces 36 and 38, bottom and top faces 40 and 42, and sides or ends 44 and 46, the latter which is also shown in FIG. 3. Shell 34 is open at its end or side 44 for receipt of cartridge 10. Its other end or side 46 comprises a wall which is at least partially closed and thus acts as a limit for receipt of the housing within the case. Partially closed end 46 has an opening 48 therein (see FIG. 3) so that knob 22 at the right hand side 20 of the cartridge is exposed for access by the listener. The other knob already extends through open end 44.

To ensure that cartridge 10 will not slip out of case 32, cooperating detents 43 and notches 45 respectively on the case and the cartridge engage when the cartridge is fully inserted in the case. Other holding means may be used, if desired.

A pair of ears 50 extend from top face 42 of the case at the corners where face 42 meets with sides 44 and 46. A pair of acoustical stems 52 extend from ears 50 and are provided with earpads 53 secured in a suitable manner to adapters on stems 52. The ends of stems 52 in ears 50 have the same spacing between them as sound openings 24 of cartridge 10 so that, when the cartridge is fully received within case 32, there will be proper alignment of openings for transmission of the sound through the stem and to the listener's ears.

If desired, case 32 is provided with a decreasing thickness of its front and rear surfaces 36 and 38 to provide a beveled configuration denoted by indicium 54, in the event that the use of a storage and sanitizing case as described in copending application Ser. No. 354,101, now U.S. Pat. No. 4,465,907, if desired.

Cartridge 10 further includes a recessed opening 56 for reception of a battery and at least one cutout 58 adjacent the battery recessed opening to facilitate removal of a battery therefrom. Alternatively, the battery may be incorporated with case 32 with provisions for automatically connecting the battery to receiving contacts on cartridge 10 when inserted into the case.

Although the invention has been described with reference to a particular embodiment thereof, it should be realized that various changes and modifications may be made therein without departing from the spirit and scope of the invention.

What is claimed is:

1. A headset receiver comprising:

a reusable cartridge housing battery-powered electronic circuitry for receiving wireless transmission of intelligible information and for converting the transmission into audible signals, and having means for control of the receiving and the converting circuitry; and a disposable case into which said cartridge is received and thereby supported, said case having means permitting access to said control means and a pair of acoustical stems extending from said case and able to be coupled to said cartridge for conveying the audible signals from said cartridge to a listener's ears only when said cartridge is received in said case.

2. A heatset receiver according to claim 1 further comprising a lanyard affixed at its ends respectively to said cartridge and to a fixed structure to secure said cartridge from theft or misplacement.

3. A headset receiver according to claim 1 in which said cartridge and said case respectively include mutually alignable ports for transmission of the audible signals from said cartridge to said acoustical stems when said cartridge is received in said case.

4. A headset receiver comprising a reusable cartridge including channel selection and volume control knobs and housing battery-powered electronic circuitry for receiving wireless transmission of intelligible information and for converting the transmission into audible signals, and a disposable tubular case having openings therein for physical receipt of said cartridge and for access to said knobs by the listener and having a pair of acoustical stems extending therefrom and able to be coupled to said cartridge for enabling the conveyance of the audible signals from said cartridge to a listener's ears only when said cartridge is received in said case.

5. A headset receiver comprising:

a reusable cartridge, including channel selection and volume control knobs which extend from opposite ends of said cartridge, and housing battery-powered electronic circuitry for receiving wireless transmission of intelligible information and for converting the transmission into audible signals, and a disposable tubular case having openings therein which are at opposed ends of said case and which comprise an entry at a first of said case ends for physical receipt of said cartridge and for enabling access to a first of said knobs by the listener, and a window in an otherwise closed wall at a second of said case ends for projection of a second of said knobs through said closed wall window for access thereto by the listener, and a pair of acoustical stems extending from said case for conveying the audible signals from said cartridge, when received in said case, to a listener's ears.

6. A headset receiver comprising:

a housing including means respectively for receiving electromagnetic energy containing intelligible information, for controlling the reception thereof, and for enabling transmission thereof; and a case having means for supporting said housing and including first and second means for permitting access respectively to said controlling means and to said transmission enabling means, and means integral with said second access permitting means and physically extending therefrom to a listener's ears to enable the intelligible information to be furnished from said transmission enabling means to the listener's ears.

7. A headset receiver according to claim 6 further including means affixing said housing to a fixed structure for securing said housing against loss from pilferage or misplacement.

8. A headset receiver according to claim 7 in which said fixed structure comprises a seat.

9. A headset receiver according to claim 7 in which said fixed structure comprises a passenger's seat on an airplane.

10. A headset receiver according to claim 9 further comprising a pouch secured to said seat for receiving said housing when not placed in said case, and in which said affixing means comprises a lanyard tethered at its ends to said housing and to said seat.

11. A headset receiver comprising:

a housing including means for receiving electromagnetic energy containing intelligible information and for controlling the reception thereof and acoustical ports through which the intelligible information is transmitted; and a case having means for supporting said housing and for permitting access to said controlling means, a pair of acoustical stems terminating in ear plugs coupled to said case for furnishing the intelligible information to a listener's ears and acoustical ports coupled to said acoustical stems and alignable with said housing acoustical ports when said housing is received in said case.

12. A headset receiver according to claim 11 further including means on said case and said housing for securing said housing within said case when fully received therein.

13. A headset receiver comprising:

a housing including means for receiving electromagnetic energy containing intelligible information, and acoustical ports through which the intelligible information is transmitted; and a case having means to which said housing can be coupled, a pair of acoustical stems terminating in ear plugs coupled to said case for furnishing the intelligible information to a listener's ears, and acoustical ports coupled to said acoustical stems and alignable with said housing acoustical ports when said housing is received in said case, said case having an exterior configuration which is shaped generally as a thin parallelepiped, tubular shell whose interior configuration is shaped generally the same as that of said housing's exterior to permit said housing to be received within said shell.

14. A headset receiver according to claim 13 wherein said shell includes opposed ends, a first of which is open for receipt of said housing and a second of which is at least partially closed to act as a limit beyond which said housing can be received within said case, said partially closed end having an opening therein, and wherein said housing includes control knobs at opposed ends thereof with one of said control knobs being adapted to extend through said first and second shell end openings when said housing is fully received within said shell, to provide access by the listener to said knobs.

15. A headset receiver according to claim 14 in which said housing and said case respectively have smooth exterior surfaces including front, rear and edge surfaces, in which said front and rear surfaces are relatively large with respect to said edge surfaces; and said housing has recessed openings in said housing edge surfaces for receiving and enclosing at least one battery and for enclosing said control knobs.

16. A headset receiver according to claim 15 in which said front and rear surfaces of both said housing and said case respectively have generally rectangular configurations with relatively long bases and top faces and relatively short sides to configure said base and top faces into relatively thin elongated surfaces and said sides into relatively thin short shapes, said recessed battery opening in said housing extending into said housing base face and said housing recessed control knob openings extending respectively into said sides.

17. A headset receiver according to claim 16 further including a pair of ears extending from said case top face at its corners with said sides, with said pairs of acoustical stems secured to each of said ears.

18. A headset receiver according to claim 17 in which said case has a decreasing thickness between said case front and rear faces from lines thereon spaced from said case top face and extending to said ear portions.

19. A headset receiver according to claim 18 in which said recessed openings of said housing includes portions of said front and rear housing faces to enhance the smoothness of said exterior surfaces by reducing the number of exterior discontinuities.

20. A headset receiver according to claim 19 further including at least one cutout in said front and rear housing faces adjacent said battery recessed opening to facilitate removal of a battery therefrom.

21. A headset receiver according to claim 19 further including a cover for means in said housing for detecting the electromagnetic energy, said cover forming a part of at least one of said housing front and rear surfaces and being flush therewith to enhance the smoothness of said exterior surfaces.

22. Apparatus for enabling a headset receiver with receiver control means to be reused in a sanitary manner, comprising:

a case for supporting the receiver; and means associated with the case for enabling the information from the receiver to be transmitted to a listener's ears and for permitting access to the control means, said information enabling means including means for enabling support of the case and the receiver by the listener's ears, said case having a configuration which permits its replacement after its use with a sanitized case.

* * * * *